US012639819B2

(12) United States Patent
Ikeda

(10) Patent No.: US 12,639,819 B2
(45) Date of Patent: May 26, 2026

(54) IMAGE PROCESSING APPARATUS, IMAGE PROCESSING METHOD, AND NON-TRANSITORY STORAGE MEDIUM

(71) Applicant: NEC Corporation, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 224 days.

(21) Appl. No.: 18/234,172

(22) Filed: Aug. 15, 2023

(65) Prior Publication Data

US 2024/0070870 A1 Feb. 29, 2024

(30) Foreign Application Priority Data

Aug. 23, 2022 (JP) ................................ 2022-132435

(51) Int. Cl.
*G06T 7/00* (2017.01)
*G06T 7/11* (2017.01)
*G06T 7/70* (2017.01)

(52) U.S. Cl.
CPC .................. *G06T 7/11* (2017.01); *G06T 7/70* (2017.01); *G06T 2207/10016* (2013.01)

(58) Field of Classification Search
CPC ... G06T 7/11; G06T 7/70; G06T 2207/10016; G06V 10/25; G06V 40/10; G06V 20/52
See application file for complete search history.

(56) References Cited

U.S. PATENT DOCUMENTS 8,837,773 B2 * 9/2014 Katano .................. G06T 7/248 382/103
2012/0092495 A1 * 4/2012 Yano ...................... G06V 20/52 382/103
2014/0072170 A1 3/2014 Zhang et al.
(Continued)

FOREIGN PATENT DOCUMENTS

CN 104813339 A 7/2015
JP 2006-262527 A 9/2006
(Continued)

OTHER PUBLICATIONS

JP Office Action for JP Application No. 2022-132435, mailed on Mar. 17, 2026 with English Translation.
(Continued)

*Primary Examiner* — Xiao Liu
(74) *Attorney, Agent, or Firm* — Sughrue Mion, PLLC

(57) ABSTRACT

To detect a stagnant object by an image analysis at high accuracy, the present invention provides an image processing apparatus 10 including: an acquisition unit 11 that acquires partial region information for each frame image, the partial region information indicating a situation of a target object in each of a plurality of partial regions within one image for each frame image; and an extraction unit 12 that extracts the partial region from a plurality of the partial regions, based on the partial region information for the each frame image, the partial region to be extracted satisfying at least one of a condition that presence of a plurality of the target objects continues at a predetermined level or higher
(Continued)

and a condition that uniformity of a state of an aggregation constituted by a plurality of the target objects being present continues at a predetermined level or higher.

13 Claims, 13 Drawing Sheets

(56) References Cited

U.S. PATENT DOCUMENTS

| | | | | |
|---|---|---|---|---|
| 2020/0050873 | A1* | 2/2020 | Ikeda | G06V 20/53 |
| 2021/0082141 | A1* | 3/2021 | Muta | G06T 7/73 |

FOREIGN PATENT DOCUMENTS

| | | | |
|---|---|---|---|
| JP | 2009-110152 | A | 5/2009 |
| JP | 2014-225118 | A | 12/2014 |
| JP | 2015-528614 | A | 9/2015 |
| JP | 2015-194911 | A | 11/2015 |
| JP | 2016-162414 | A | 9/2016 |
| WO | 2013/057904 | A1 | 4/2013 |
| WO | 2017/154655 | A1 | 9/2017 |
| WO | 2018/025831 | A1 | 2/2018 |

OTHER PUBLICATIONS

Junya Miyagi et al., “Visual Analysis Techniques for Event Security Management,” -Information and Communication Technology of IoT-, Mitsubishi Denki Giho, Mitsubishi Electric Engineering Company, Limited, Jul. 20, 2016, vol. 90, No. 7, pp. 16-20.

Manasi Pathade et al., “Detection of Dispersion in Crowd Scenes for Surveillance Applications,” 2018 2nd International Conference on Trends in Electronics and Informatics (ICOEI) [online], IEEE, 2018, pp. 880-883, [Retrieved on Mar. 9, 2026], Internet URL<https://ieeexplore.ieee.org/stamp/stamp.jsp?tp=&arnumber=8553923>, Doi:10.1109/ICOEI.2018.8553923.

* cited by examiner

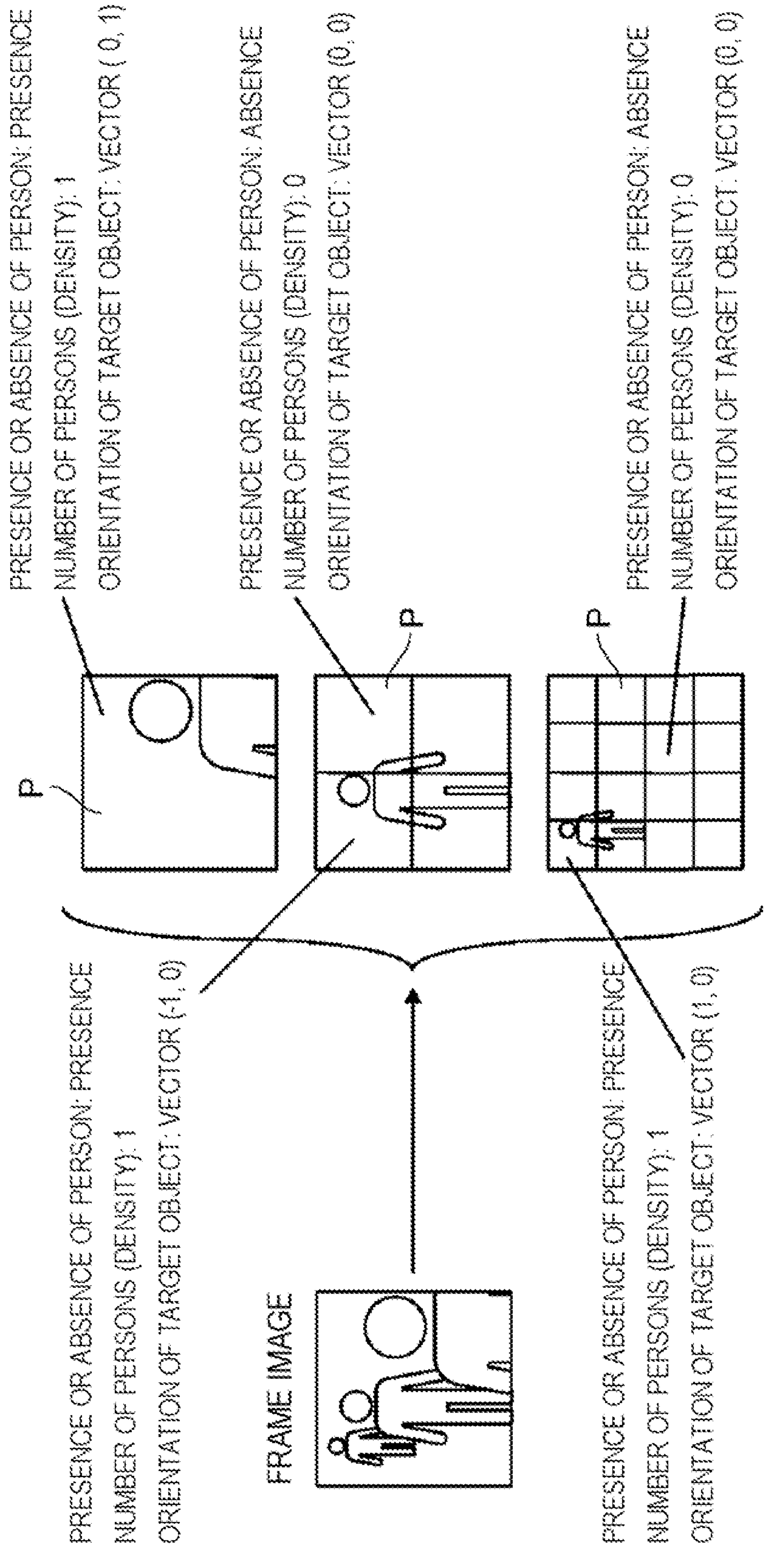

FIG. 3

PRESENCE OR ABSENCE OF PERSON: PRESENCE
NUMBER OF PERSONS (DENSITY): 1
ORIENTATION OF TARGET OBJECT: VECTOR ( 0, 1 )

PRESENCE OR ABSENCE OF PERSON: ABSENCE
NUMBER OF PERSONS (DENSITY): 0
ORIENTATION OF TARGET OBJECT: VECTOR (0, 0)

PRESENCE OR ABSENCE OF PERSON: ABSENCE
NUMBER OF PERSONS (DENSITY): 0
ORIENTATION OF TARGET OBJECT: VECTOR (0, 0)

P

P

P

PRESENCE OR ABSENCE OF PERSON: PRESENCE
NUMBER OF PERSONS (DENSITY): 1
ORIENTATION OF TARGET OBJECT: VECTOR (-1, 0)

PRESENCE OR ABSENCE OF PERSON: PRESENCE
NUMBER OF PERSONS (DENSITY): 1
ORIENTATION OF TARGET OBJECT: VECTOR (1, 0)

FRAME IMAGE

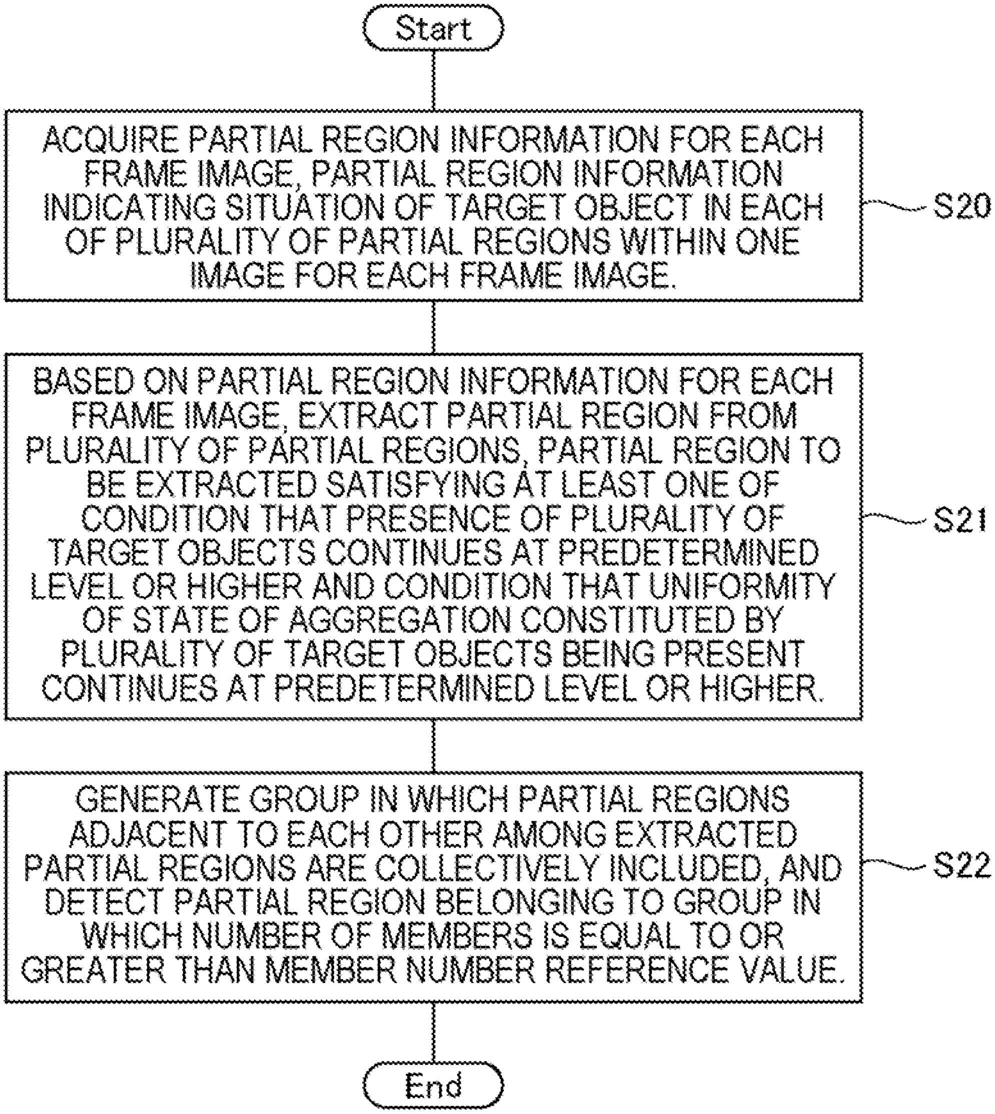

FIG. 8

Start

ACQUIRE PARTIAL REGION INFORMATION FOR EACH
FRAME IMAGE, PARTIAL REGION INFORMATION
INDICATING SITUATION OF TARGET OBJECT IN EACH
OF PLURALITY OF PARTIAL REGIONS WITHIN ONE
IMAGE FOR EACH FRAME IMAGE.                                    S20

BASED ON PARTIAL REGION INFORMATION FOR EACH
FRAME IMAGE, EXTRACT PARTIAL REGION FROM
PLURALITY OF PARTIAL REGIONS, PARTIAL REGION TO
BE EXTRACTED SATISFYING AT LEAST ONE OF
CONDITION THAT PRESENCE OF PLURALITY OF
TARGET OBJECTS CONTINUES AT PREDETERMINED            S21
LEVEL OR HIGHER AND CONDITION THAT UNIFORMITY
OF STATE OF AGGREGATION CONSTITUTED BY
PLURALITY OF TARGET OBJECTS BEING PRESENT
CONTINUES AT PREDETERMINED LEVEL OR HIGHER.

GENERATE GROUP IN WHICH PARTIAL REGIONS
ADJACENT TO EACH OTHER AMONG EXTRACTED
PARTIAL REGIONS ARE COLLECTIVELY INCLUDED, AND      S22
DETECT PARTIAL REGION BELONGING TO GROUP IN
WHICH NUMBER OF MEMBERS IS EQUAL TO OR
GREATER THAN MEMBER NUMBER REFERENCE VALUE.

End

IMAGE PROCESSING APPARATUS, IMAGE PROCESSING METHOD, AND NON-TRANSITORY STORAGE MEDIUM

This application is based upon and claims the benefit of priority from Japanese patent application No. 2022-132435, filed on Aug. 23, 2022, the disclosure of which is incorporated herein in its entirety by reference.

TECHNICAL FIELD

The present invention relates to an image processing apparatus, an image processing method, and a program.

BACKGROUND ART

Techniques relating to the present invention are disclosed in Patent Document 1 (Japanese Patent Application Publication No. 2006-262527), Patent Document 2 (Japanese Patent Application Publication No. 2009-110152), and Patent Document 3 (International Patent Publication No. WO2018/025831).

Patent Document 1 discloses a technique of detecting a detected object (a candidate for a stagnant object), based on a comparison result between an input image and a reference image, then deciding whether the detected object is a new detected object, based on a position or a size of the detected object, computing a stagnation time of the detected object, based on the decision result, and detecting the detected object whose stagnation time exceeds a reference, as a stagnant object.

Patent Document 2 discloses a technique of dividing an image into a plurality of regions, and deciding which one of a stagnation region, a moving region, a noise region, and a foreground region each region is equivalent to. Further, it is disclosed that a region decided to be motionless with human presence is decided as the stagnant region. Decision on presence or absence of motion is achieved by determining a correlation between characteristic points in two images and referring to a motion vector acquired by connecting the characteristic points associated with each other.

Patent Document 3 discloses a technique of estimating the number of present persons, an orientation of the present person, and a moving amount, for each partial region of an image, and generating information indicating a flow of a person, based on the estimation result. Further, there is disclosed a tendency that a motion amount is smaller as a similarity degree between feature values of image patterns is higher.

DISCLOSURE OF THE INVENTION

There has been desired a technique for detecting a stagnant object by an image analysis. A person and an object gather to form a stagnant object. For example, a crowd (spectators) or the like formed near a location where an abnormality suddenly occurs is a stagnant object being a detection target.

In the technique disclosed in Patent Document 1, it is decided whether each detected object is a stagnant object, based on a position or a size of the detected object (a candidate for a stagnant object). Specifically, in the technique disclosed in Patent Document 1, it is decided whether the detected object (a candidate for a stagnant object) is a new detected object, based on a position or a size of the detected object, and a stagnation time of the detected object is computed based on the decision result. In a case of the above-mentioned technique disclosed in Patent Document 1, when a position or a size of the detected object changes, it is decided that the detected object is a new detected object. Thus, in a case of the technique disclosed in Patent Document 1, detection accuracy for a stagnant object that stagnates while changing the shape or size is degraded. For example, a shape or a size of a stagnant object formed by gathering a person change due to an inflow or an outflow of a person, switching of a person, or the like.

As described above, in the technique disclosed in Patent Document 2, a correlation between characteristic points in two images is determined, and a region being decided to be motionless, based on a motion vector acquired by connecting the characteristic points associated with each other, is decided as a stagnant region. In the technique, when a person or an object being positioned at a certain point in a stagnant object moves, and another person or object moves to the point in a switching manner, it is decided that motion is present. Thus, in a case of the technique disclosed in Patent Document 2, when the switching as described above occurs, detection accuracy for a stagnant object is degraded.

As described above, the technique disclosed in Patent Document 3 discloses a tendency that a motion amount is smaller as a similarity degree between feature values of image patterns is higher. In the technique, when a person or an object being positioned at a certain point in a stagnant object moves, and another person or object moves to the point in a switching manner, a motion amount is increased. Thus, in a case of the technique disclosed in Patent Document 3, when the switching as described above occurs, detection accuracy for a stagnant object is degraded.

One example of an object of the present invention is, in view of the problem described above, to provide an image processing apparatus, an image processing method, and a program that solve the problem in detecting a stagnant object by an image analysis at high accuracy.

One aspect of the present invention provides an image processing apparatus including:

- an acquisition unit that acquires partial region information for each frame image, the partial region information indicating a situation of a target object in each of a plurality of partial regions within one image for each frame image; and
- an extraction unit that extracts the partial region from a plurality of the partial regions, based on the partial region information for the each frame image, the partial region to be extracted satisfying at least one of a condition that presence of a plurality of the target objects continues at a predetermined level or higher and a condition that uniformity of a state of an aggregation constituted by a plurality of the target objects being present continues at a predetermined level or higher.

One aspect of the present invention provides an image processing method including, by a computer:

- acquiring partial region information for each frame image, the partial region information indicating a situation of a target object in each of a plurality of partial regions within one image for each frame image; and
- extracting the partial region from a plurality of the partial regions, based on the partial region information for the each frame image, the partial region to be extracted satisfying at least one of a condition that presence of a plurality of the target objects continues at a predetermined level or higher and a condition that uniformity of a state of an aggregation constituted by a plurality of the target objects being present continues at a predetermined level or higher.

One aspect of the present invention provides a program causing a computer to function as:

an acquisition unit that acquires partial region information for each frame image, the partial region information indicating a situation of a target object in each of a plurality of partial regions within one image for each frame image; and an extraction unit that extracts the partial region from a plurality of the partial regions, based on the partial region information for the each frame image, the partial region to be extracted satisfying at least one of a condition that presence of a plurality of the target objects continues at a predetermined level or higher and a condition that uniformity of a state of an aggregation constituted by a plurality of the target objects being present continues at a predetermined level or higher.

According to one aspect of the present invention, an image processing apparatus, an image processing method, and a program that solve the problem in detecting a stagnant object by an image analysis at high accuracy is achieved.

BRIEF DESCRIPTION OF THE DRAWINGS

The object and other objects that are described above, the characteristics, and the advantageous effects are further clarified by the preferred example embodiments given below and the accompanying drawings given below.

FIG. 3 is a diagram describing partial region information for each frame image.

FIG. 8 is a flowchart illustrating one example of a flow of processing of the image processing apparatus.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

First Example Embodiment

Figure 1:
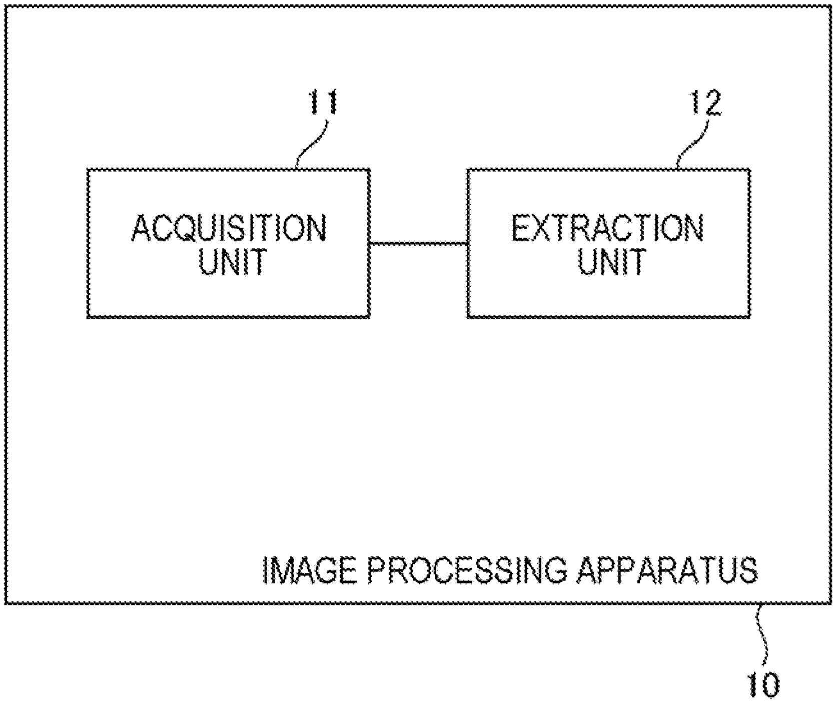
FIG. 1 is a diagram illustrating one example of a function block diagram of an image processing apparatus.

FIG. 1 is a function block diagram illustrating an overview of an image processing apparatus 10 according to the first example embodiment. The image processing apparatus 10 includes an acquisition unit 11 and an extraction unit 12.

The acquisition unit 11 acquires partial region information for each frame image, the partial region information indicating a situation of a target object in each of a plurality of partial regions within one image for each frame image. The extraction unit 12 extracts a partial region from a plurality of the partial regions, based on the partial region information for each frame image, the partial region to be extracted satisfying at least one of a condition that presence of a plurality of target objects continues at a predetermined level or higher and a condition that uniformity of a state of an aggregation constituted by the plurality of target objects being present continues at a predetermined level or higher.

The image processing apparatus 10 thus configured solves the problem in detecting a stagnant object by an image analysis at high accuracy.

Second Example Embodiment

"Overview"

An image processing apparatus 10 of the second example embodiment is acquired by further embodying the image processing apparatus 10 of the first example embodiment.

The image processing apparatus 10 of the present example embodiment decides presence of a plurality of target objects, continuity of presence of the plurality of target objects, continuity of a state of an aggregation constituted by the plurality of target objects, or the like for "each of partial regions" within one image, and decides whether to be a candidate for a stagnant object (a partial region in which the stagnant object is possibly present) for "each of the partial regions", based on the decision result. The image processing apparatus 10 of the present example embodiment performs decision for "each of the partial regions (for each part of the stagnant object)", instead of deciding whether to be the candidate for the stagnant object for "each of detected objects" detected in the image, based on a state (position or size) of the entire detected object as in the technique disclosed in Patent Document 1. Thus, according to the image processing apparatus 10 of the present example embodiment, a stagnant object stagnating while changing the shape or size can also be detected at high accuracy.

Further, the image processing apparatus 10 of the present example embodiment extracts the partial region from the plurality of partial regions as the candidate for the stagnant object, the partial region to be extracted satisfying at least one of a condition that presence of the plurality of target objects continues at a predetermined level or higher and a condition that uniformity of a state of an aggregation constituted by the plurality of target objects being present continues at a predetermined level or higher. Note that, in the extraction, the uniformity of the target object present in each of the partial regions (for example, presence of the same person) is not required. Specifically, even when a person or an object being positioned at a certain point in a stagnant object moves, and another person or object moves to the point in a switching manner, the image processing apparatus 10 of the present example embodiment extracts the partial region satisfying the above-mentioned condition as the candidate for the stagnant object. Thus, even when the switching as described above occurs, the image processing apparatus 10 of the present example embodiment can detect the stagnant object at high accuracy, unlike the techniques disclosed in Patent Documents 2 and 3.

A configuration of the image processing apparatus 10 is described below in detail.

"Hardware Configuration"

Next, one example of a hardware configuration of the image processing apparatus 10 is described. Each of the function units of the image processing apparatus 10 is achieved by any combination of hardware and software that mainly include a central processing unit (CPU) of any computer, a memory, a program loaded into the memory, a storage unit such as a hard disk for storing the program (capable of storing a program downloaded from a storage medium such as a compact disc (CD), a server on the Internet, or the like, in addition to a program stored in advance in an apparatus at a time of shipping), and an interface for network connection. Further, a person skilled in the art understands that various modifications may be made to the implementation method and the apparatus.

Figure 2:
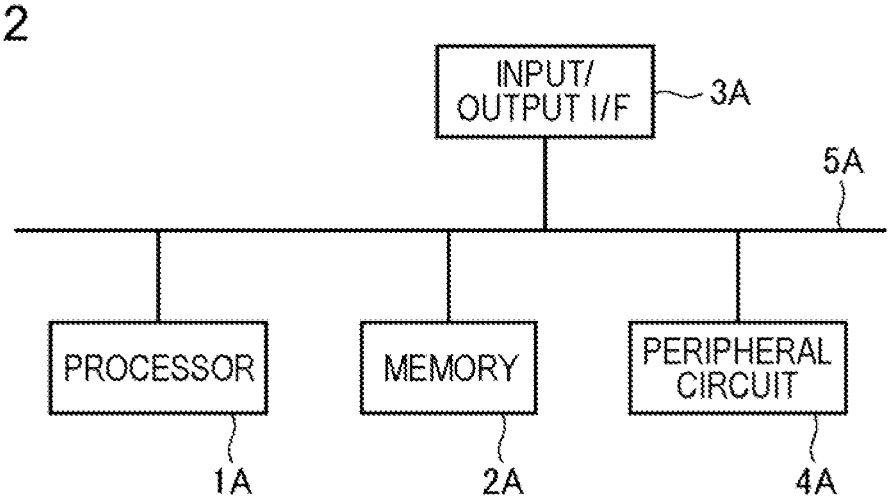
FIG. 2 is a diagram illustrating one example of a hardware configuration of the image processing apparatus.

FIG. 2 is a block diagram illustrating a hardware configuration of the image processing apparatus 10. As illustrated in FIG. 2, the image processing apparatus 10 includes a processor 1A, a memory 2A, an input/output interface 3A, a peripheral circuit 4A, and a bus 5A. The peripheral circuit 4A includes various modules. The image processing apparatus 10 may not include the peripheral circuit 4A. Note that, the image processing apparatus 10 may be configured by a plurality of apparatuses that are separated physically and/or logically. In this case, each of the plurality of apparatuses can include the above-mentioned configuration example.

The bus 5A is a data transmission path in which the processor 1A, the memory 2A, the peripheral circuit 4A, and the input/output interface 3A mutually transmit and receive data. For example, the processor 1A is an arithmetic processing apparatus such as a CPU and a graphics processing unit (GPU). For example, the memory 2A is a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. Example of the input apparatus is a keyboard, a mouse, a microphone, a physical button, a touch panel, and the like. Example of the output apparatus include a display, a speaker, a printer, a mailer, and the like. The processor 1A is capable of issuing a command to each of the modules and executing an arithmetic operation, based on the arithmetic operation results.

"Function Configuration"

Next, details of a function configuration of the image processing apparatus 10 of the second example embodiment are described. FIG. 1 illustrates one example of a function block diagram of the image processing apparatus 10. As illustrated, the image processing apparatus includes an acquisition unit 11 and an extraction unit 12.

The acquisition unit 11 acquires the partial region information for each frame image, the partial region information indicating a situation of a target object in each of a plurality of partial regions within one image for each frame image.

With reference to FIG. 3, the partial region information for each frame image is described. FIG. 3 illustrates an example of the partial region information for each frame image being generated from one frame image.

A "target object" is an object forming a stagnant object, and includes, but is not limited to, a person, an animal, an automobile, a bicycle, and the like, for example.

A "partial region P" is a partial region within the image. For example, the frame image is divided into a lattice form. Further, each of the divided regions is the partial region P. In a modification example, the entire image may be further handled as one example of the partial region P.

In the present example embodiment, as illustrated in FIG. 3, the plurality of partial regions P having different sizes from each other are set with respect to one frame image, and partial region information for each frame image is generated. FIG. 3 illustrates a partial region P generated by dividing an image into four regions, a partial region P generated by dividing the image into sixteen regions, and a partial region P configured by the entire image. A size of the partial region P differs depending on the number of division. The size of the partial region P (the number of division) may be determined in advance, or may be determined based on a size of a target object detected in the image. However, the partial region P is set by the same method for all the plurality of frame images. Specifically, when the partial region P configured by the entire image, the partial region P generated by dividing the image into four regions, and the partial region P generated by dividing the image into sixteen regions are set with respect to a certain frame image as illustrated in FIG. 3, the partial region P configured by the entire image, the partial region P generated by dividing the image into four regions, and the partial region P generated by dividing the image into sixteen regions are similarly set with respect to another frame image.

A "situation of a target object" indicates presence or absence of the target object ("presence or absence of a person" in FIG. 3), the number of target objects ("the number of persons (density)" in FIG. 3), and an orientation of the target object. Each of them is described below.

"Presence or absence of the target object" indicates whether the target object is present in each of the partial regions P. This item is indicated by two values including "presence" and "absence". A case in which one or more target objects are present is indicated by "presence", and a case in which no target object is present is indicated by "absence".

Note that, it is decided that one target object is present in one of the plurality of partial regions P, and the partial region information for each frame image is generated based on the decision result. There is not such a case in which one object is decided to be present in the plurality of partial regions P. For example, there is a case in which one target object is present over the plurality of partial regions P adjacent to each other. Even in this case, one target object is decided to be present in one partial region P, and is not decided to be present in the plurality of partial regions P. For example, in order to achieve this, it may be decided that a target object is present in the partial region P in which a predetermined point of the target object (in a case of a person, a face, a nose, or the like) is present, or another method may be adopted.

Further, when the partial region P is set by dividing an image by a plurality of methods (division into four, division into sixteen, and the like) as described above, the plurality of partial regions P having different sizes from each other are set. Further, a situation in which the partial regions P having different sizes from each other partially overlap with each other may occur, and a situation in which the target object is present in the overlapping part may also occur. Even in this case, one target object is decided to be present in one of the plurality of partial regions P, and is not decided to be present in the plurality of partial regions P.

In order to achieve this, a size of the target object decided to be present in the partial region P having a predetermined size is determined in advance. For example, the size of the target object decided to be present in the partial region P configured by the entire image is determined as a range between "B2 and B3", the size of the target object decided to be present in the partial region P generated by dividing the image into four regions is determined as a range between "B1 and B2", and the size of the target object decided to be present in the partial region P generated by dividing the image into sixteen regions is determined as a range between "B0 and B1". In this case, the target object having a size falling within the range between "B0 and B1" is decided to be present in any of the partial regions P generated by dividing the image into sixteen regions, and is not decided to be present in the partial region P generated by dividing the image into four regions or the partial region P configured by the entire image. Similarly, the target object having a size falling within the range between "B1 and B2" is decided to be present in any of the partial regions P generated by dividing the image into four regions, and is not decided to be present in the partial region P generated by dividing the image into sixteen regions or the partial region P configured by the entire image. Similarly, the target object having a size falling within the range between "B2 and B3" is decided to be present in the partial region P configured by the entire image, and is not decided to be present in the partial region P generated by dividing the image into sixteen regions or the partial region P generated by dividing the image into four regions.

The size of the target object may be defined by various methods. For example, when the target object is a person, a size of a face, a height, or the like may be defined as the size of the target object.

"The number of target objects" indicates the number of target objects that are decided to be present in each of the partial regions P. In a case of the example in FIG. 3, three persons having different sizes from each other are captured in the frame image. As a matter of course, all of the three persons are included in the partial region P configured by the entire image. However, as described above, when the size of the target object decided to be present in the partial region P configured by the entire image is limited to the range between "B2 and B3", only a person who satisfies the size condition among the three persons is decided to be present in the partial region P configured by the entire image. As a result, as illustrated in FIG. 3, the number of target objects to be present in the partial region P configured by the entire image is one person.

"The orientation of the target object" indicates an orientation of the target object decided to be present in each of the partial regions P. The orientation of the target object may be defined by various methods. For example, when the target object is a person, a direction in which a face is oriented may be defined as the orientation of the target object, or another method may be adopted. Further, when the target object is an automobile or a bicycle, a direction in which a front surface of the automobile or bicycle is oriented may be defined as the orientation of the target object, or another method may be adopted. The orientation of the target object can be indicated with a vector or the like.

Note that, even when the plurality of target objects are present in one partial region P, the orientation of the target object in the partial region P being indicated in the partial region information for each frame image is one orientation. For example, one orientation can be computed from orientations of the plurality of target objects by any method such as averaging.

There are various types of means for acquiring the above-mentioned partial region information for each frame image by the acquisition unit 11. For example, the acquisition unit 11 may analyze an image, and generate the partial region information for each frame image. Alternatively, another apparatus being physically and/or logically separated from the image processing apparatus 10 may analyze the image and generate the partial region information for each frame image, and the generated partial region information for each frame image may be input to the image processing apparatus 10 by any means. Further, the acquisition unit 11 may acquire the input partial region information for each frame image. Generation of the partial region information for each frame image is achieved by using a widely known image analysis technique such as human detection and object detection. For example, it may be achieved by using the technique disclosed in Patent Document 3.

With reference back to FIG. 1, the extraction unit 12 extracts the partial region P as a stagnant candidate from the plurality of partial regions P, based on the partial region information for each frame image being acquired by the acquisition unit 11. The stagnant candidate indicates the partial region P in which a stagnant object is possibly present.

The extraction unit 12 extracts the partial region P from the plurality of partial regions P as the stagnant candidate, the partial region P to be extracted satisfying at least one (for example, both) of "the condition that presence of the plurality of target objects continues at the predetermined level or higher" and "the condition that the uniformity of the state of the aggregation constituted by the plurality of target objects being present continues at the predetermined level or higher".

"The condition that presence of the plurality of target objects continues at the predetermined level or higher" is a condition relating to presence continuity for requiring the plurality of target objects to be continuously present there at the predetermined level or higher. Note that, in decision of the condition, the uniformity of the target object to be present in each of the partial regions P (for example, presence of the same person) is not required. Specifically, not only a case in which presence of the plurality of target objects continues at the predetermined level or higher while the same target object is continuously present in a certain partial region P, but also a case in which presence of the plurality of target objects continues at the predetermined level or higher while target objects present in a certain partial region P are switched satisfies "the condition that presence of the plurality of target objects continues at the predetermined level or higher" described above.

The extraction unit 12 can be decided the condition that presence of the plurality of target objects continues at the predetermined level or higher by any one of the following first to fourth methods, for example.

—First Method—

Figure 4:
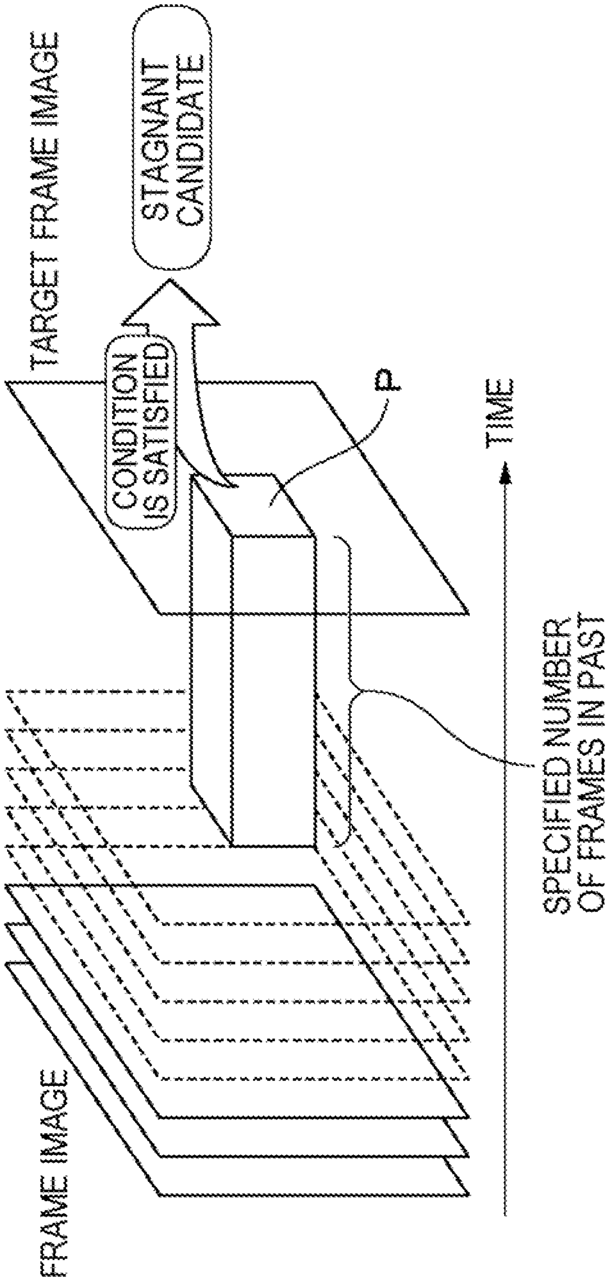
FIG. 4 is a diagram describing processing of extracting a partial region as a candidate for a stagnant object.

As illustrated in FIG. 4, for each of the partial regions P, the extraction unit 12 decides whether a ratio of a frame image including M or more target objects (M is an integer of two or more) with respect to the predetermined number of consecutive frame images (in the figure, the specified number of frames in a past) is equal to or greater than a ratio reference value. Further, the extraction unit 12 decides that, in the partial region P satisfying the condition, presence of the plurality of target objects continues at the predetermined level or higher. In this method, "the ratio of the frame image including M or more target objects (M is an integer of two or more) with respect to the predetermined number of consecutive frame images" defines a "predetermined level of the presence continuity".

—Second Method—

As illustrated in FIG. 4, for each of the partial regions P, the extraction unit 12 decides whether the ratio of the frame image including M or more target objects with respect to the predetermined number of consecutive frame images (in the figure, the specified number of frames in the past) is equal to or greater than the ratio reference value, and whether the number of consecutive frame images including M or more target objects is equal to or greater than a consecutive number reference value. Further, the extraction unit 12 decides that, in the partial region P satisfying the condition, presence of the plurality of target objects continues at the predetermined level or higher. In this method, "the ratio of the frame image including M or more target objects (M is an integer of two or more) with respect to the predetermined number of consecutive frame images" and "the number of consecutive frame images including M or more target objects" define "the predetermined level of the presence continuity".

—Third Method—

As illustrated in FIG. 4, for each of the partial regions P, the extraction unit 12 decides whether the target object is detected (it is decided that the target object is present) in the predetermined number of consecutive frame images (in the figure, the specified number of frames in the past), and whether the ratio of the frame image including M or more target objects is equal to or greater than the ratio reference value. Further, the extraction unit 12 decides that, in the partial region P satisfying the condition, presence of the plurality of target objects continues at the predetermined level or higher. In this method, "the ratio of the frame image including M or more target objects (M is an integer of two or more) with respect to the predetermined number of consecutive frame images" defines "the predetermined level of the presence continuity".

—Fourth Method—

As illustrated in FIG. 4, for each of the partial regions P, the extraction unit 12 decides whether the target object is detected (it is decided that the target object is present) in the predetermined number of consecutive frame images (in the figure, the specified number of frames in the past), whether the ratio of the frame image including M or more target objects is equal to or greater than the ratio reference value, and whether the number of consecutive frame images including M or more target objects is equal to or greater than the consecutive number reference value. Further, the extraction unit 12 decides that, in the partial region P satisfying the condition, presence of the plurality of target objects continues at the predetermined level or higher. In this method, "the ratio of the frame image including M or more target objects (M is an integer of two or more) with respect to the predetermined number of consecutive frame images" and "the number of consecutive frame images including M or more target objects" define "the predetermined level of the presence continuity".

"The condition that the uniformity of the state of the aggregation constituted by the plurality of target objects being present continues at the predetermined level or higher" is a condition relating to state continuity for requiring the aggregation constituted by the plurality of target objects to maintain a similar state. Note that, in decision of the condition, the uniformity of the target object to be present in each of the partial regions P (for example, presence of the same person) is not required. Specifically, not only a case in which the uniformity of the state of the aggregation constituted by the plurality of target objects being present continues at the predetermined level or higher while the same target object is continuously present in a certain partial region P, but also a case in which the uniformity of the state of the aggregation constituted by the plurality of target objects being present continues at the predetermined level or higher while target objects present in a certain partial region P are switched satisfies "the condition that the uniformity of the state of the aggregation constituted by the plurality of target objects being present continues at the predetermined level or higher" described above.

The extraction unit 12 can be decided the condition that the uniformity of the state of the aggregation constituted by the plurality of target objects being present continues at the predetermined level or higher, based on at least one of density of the plurality of target objects and an orientation of the plurality of target objects. The extraction unit 12 may execute any one of the following fifth to seventh methods, for example.

—Fifth Method—

For each of the partial regions P, the extraction unit 12 computes dispersion of the density of the plurality of target objects, based on a part or all of the predetermined number of consecutive frame images (in FIG. 4, the specified number of frames in the past). Further, the extraction unit 12 decides that, in the partial region P being a region in which the computed dispersion is equal to or less than a dispersion reference value, the uniformity of the state of the aggregation constituted by the plurality of target objects being present continues at the predetermined level or higher. In this method, "the dispersion of the density of the plurality of target objects being computed based on a part or all of the predetermined number of consecutive frame images" defines a "predetermined level of state uniformity". Note that, the density is acquired based on an area of each of the partial regions P and the number of target objects present in each of the partial regions P. The area of each of the partial regions P is equal throughout the plurality of frame images, and hence the dispersion may be computed by regarding the number of target objects present in each of the partial regions P as the density.

When "a part" of the predetermined number of consecutive frame images is based, the extraction unit 12 can perform computation of the dispersion and decision, based on the frame image including M or more target objects among the predetermined number of consecutive frame images, for example.

—Sixth Method—

For each of the partial regions P, the extraction unit 12 computes dispersion of the orientation of the plurality of target objects, based on a part or all of the predetermined number of consecutive frame images (in FIG. 4, the specified number of frames in the past). Further, the extraction unit 12 decides that, in the partial region P being a region in which the computed dispersion is equal to or less than the dispersion reference value, the uniformity of the state of the aggregation constituted by the plurality of target objects being present continues at the predetermined level or higher. In this method, "the dispersion of the orientation of the plurality of target objects being computed based on a part or all of the predetermined number of consecutive frame images" defines "the predetermined level of the state uniformity".

When "a part" of the predetermined number of consecutive frame images is based, the extraction unit 12 may perform computation of the dispersion and decision, based on the frame image including M or more target objects among the predetermined number of consecutive frame images, for example.

—Seventh Method—

For each of the partial regions P, the extraction unit 12 computes the dispersion of the density and the dispersion of the orientation of the plurality of target objects, based on a part or all of the predetermined number of consecutive frame images (in FIG. 4, the specified number of frames in the past). Further, the extraction unit 12 decides that, in the partial region P being a region in which both of the dispersion of the density and the dispersion of the orientation that are computed are equal to or less than the dispersion reference value, the uniformity of the state of the aggregation constituted by the plurality of target objects being present continues at the predetermined level or higher. In a modification example, the extraction unit 12 may decides that, in the partial region P being a region in which at least one of the dispersion of the density and the dispersion of the orientation that are computed is equal to or less than the dispersion reference value, the uniformity of the state of the aggregation constituted by the plurality of target objects being present continues at the predetermined level or higher. In this method, "the dispersion of the density and the dispersion of the orientation of the plurality of target objects that are computed based on a part or all of the predetermined number of consecutive frame images" define "the predetermined level of the state uniformity".

When "a part" of the predetermined number of consecutive frame images is based, the extraction unit 12 may perform computation of the dispersion and decision, based on the frame image including M or more target objects among the predetermined number of consecutive frame images, for example.

Figure 5:
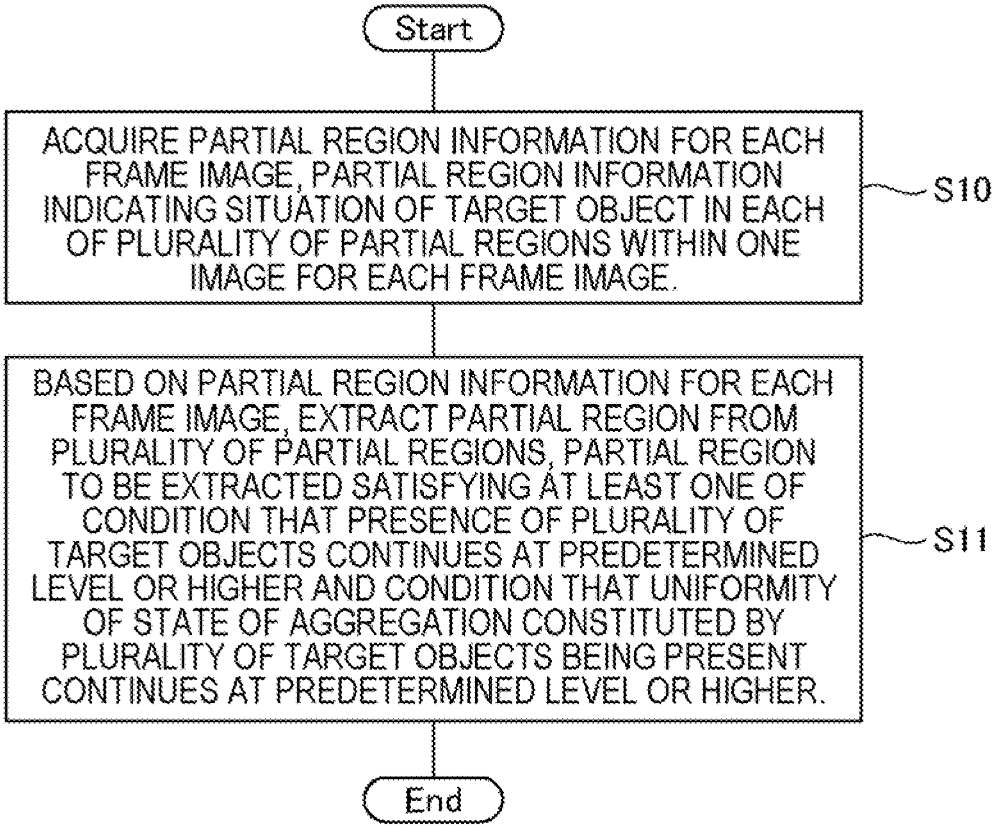
FIG. 5 is a flowchart illustrating one example of a flow of processing of the image processing apparatus.

Next, with reference to a flowchart in FIG. 5, one example of a flow of processing of the image processing apparatus 10 is described.

First, the image processing apparatus 10 acquires partial region information for each frame image, the partial region information indicating a situation of a target object in each of a plurality of partial regions P within one image for each frame image (S10).

Subsequently, based on the partial region information for each frame image being acquired in S10, the image processing apparatus 10 extracts the partial region P from the plurality of partial regions P as a stagnant candidate, the partial region P to be extracted satisfying at least one (for example, both) of the condition that presence of the plurality of target objects continues at a predetermined level or higher and the condition that uniformity of a state of an aggregation constituted by the plurality of target objects being present continues at a predetermined level or higher (S11).

Note that, the image processing apparatus 10 may output information indicating the partial region P detected as the stagnant object. For example, the image processing apparatus may output an image acquired by superposing, on a frame image, the information (for example, a frame surrounding the partial region P or the like) indicating the partial region P detected as the stagnant object. The output is achieved via an output apparatus such as a display, a projection apparatus, and a printer. Note that, the information to be output may include the partial region information (presence or absence of the target object, the number of target objects, and the orientation of the target object) for each frame image that relates to the detected partial region P, in addition to the information indicating the partial region P detected as the stagnant object.

Advantageous Effects

The image processing apparatus 10 of the present example embodiment decides presence of a target object, continuity of presence of the target object, continuity of a state of an aggregation constituted by the plurality of target objects, or the like for "each of partial regions P" within one image, and decides whether "each of the partial regions P" is a candidate for a stagnant object (the partial region P in which the stagnant object is possibly present), based on the decision result. The image processing apparatus 10 of the present example embodiment performs decision for "each of the partial regions P (for each part of the stagnant object)", instead of deciding whether "each of the detected objects" detected in the image is the candidate for the stagnant object, based on a state of the entire detected object (position or size) as in the technique disclosed in Patent Document 1. Thus, according to the image processing apparatus 10 of the present example embodiment, a stagnant object stagnating while changing a shape or size can also be detected at high accuracy.

Further, the image processing apparatus 10 of the present example embodiment extracts the partial region P from the plurality of partial regions P as the candidate for the stagnant object, the partial region P to be extracted satisfying at least one of a condition that presence of a plurality of target objects continues at a predetermined level or higher and a condition that uniformity of a state of an aggregation constituted by the plurality of target objects being present continues at a predetermined level or higher. Note that, in the extraction, uniformity of the target object present in each of the partial regions P (for example, presence of the same person) is not required. Specifically, even when a person or an object being positioned at a certain point in a stagnant object moves, and another person or object moves to the point in a switching manner, the image processing apparatus 10 of the present example embodiment extracts the partial region P satisfying the above-mentioned condition as the candidate for the stagnant object. Thus, even when the switching as described above occurs, the image processing apparatus 10 of the present example embodiment can detect the stagnant object at high accuracy, unlike the techniques disclosed in Patent Documents 2 and 3.

Third Example Embodiment

An image processing apparatus 10 of the third example embodiment decides a partial region P being a stagnant object from a plurality of partial regions P extracted as a stagnant candidate, based on a positional relationship of the plurality of partial regions P extracted as the stagnant candidates. Details thereof are described below.

Figure 6:
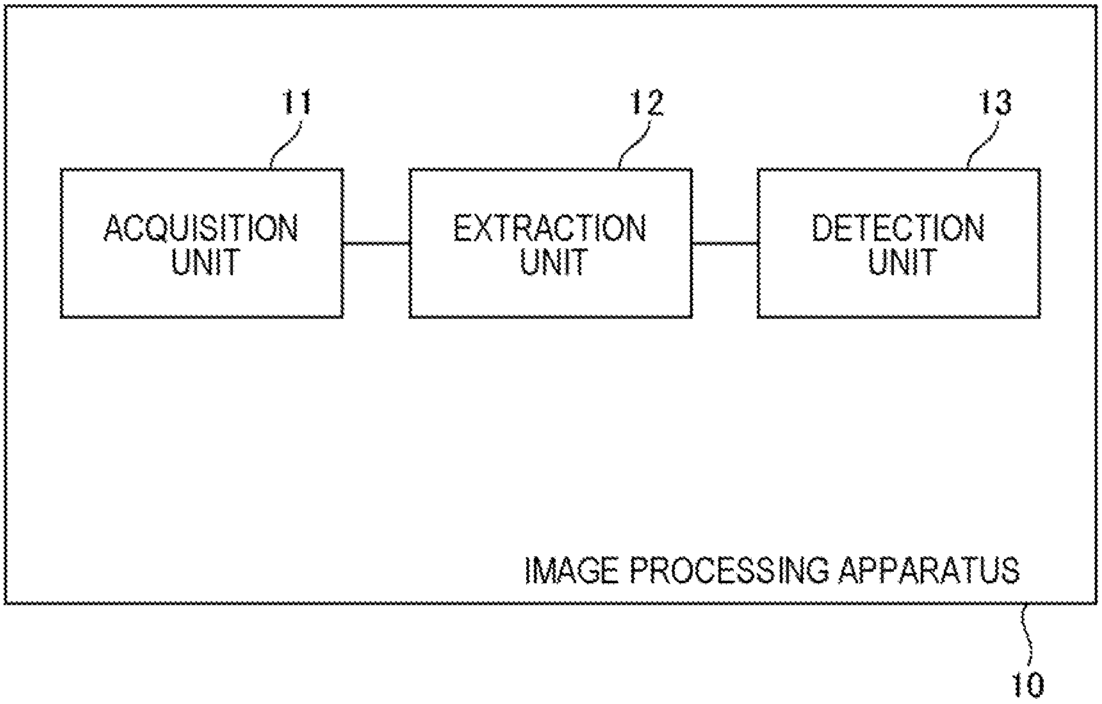
FIG. 6 is a diagram illustrating one example of a function block diagram of the image processing apparatus.

FIG. 6 illustrates one example of a function block diagram of the image processing apparatus 10. As illustrated, the image processing apparatus 10 includes an acquisition unit 11, an extraction unit 12, and a detection unit 13.

The detection unit 13 generates a group in which the partial regions P adjacent to each other among the plurality of partial regions P (the stagnant candidates) extracted by the extraction unit 12 are collectively included. Further, the detection unit 13 detects the partial region P as the stagnant object (the partial region P in which the stagnant object is present), the partial region P belonging to a group in which the number of members (the number of partial regions P belonging thereto) is equal to or greater than a member number reference value.

"Two partial regions P adjacent to each other" indicate two partial regions P satisfying "side-to-side contact" and "matching sizes". Two partial regions P satisfying "pointto-point contact" and "the matching sizes" may be included as the two partial regions P adjacent to each other, or may not be included.

Note that, in a case in which a first partial region P and a second partial region P are adjacent to each other, and the second partial region P and a third partial region P are adjacent to each other, even when the first partial region P and the third partial region P are not adjacent to each other, the first partial region P, the second partial region P, and the third partial region P belong to the same group.

Figure 7:
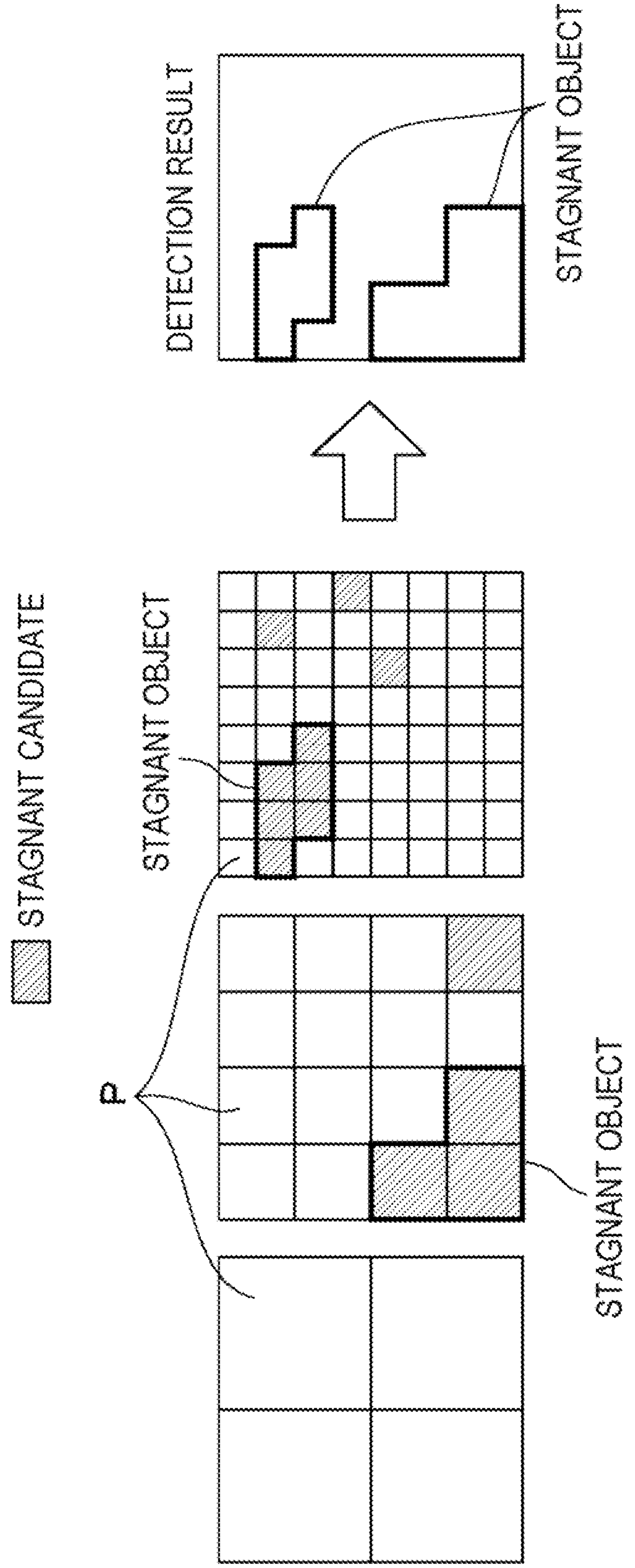
FIG. 7 is a diagram describing processing of detecting a partial region as a stagnant object.

With reference to FIG. 7, processing of the detection unit 13 is described. FIG. 7 illustrates a partial region P generated by dividing an image into four regions, a partial region P generated by dividing the image into sixteen regions, and a partial region P generated by dividing the image into sixty-four regions. The partial region P with a pattern is the partial region P extracted as the stagnant candidate by the detection unit 13.

Among the partial regions P generated by dividing the image into four regions, there is no partial region P extracted as the stagnant candidate.

Among the partial regions P generated by dividing the image into sixteen regions, there are four partial regions P extracted as the stagnant candidates. Further, the three partial regions P among those belong to the same group, and the partial regions P belonging to the group are decided as the stagnant object.

Among the partial regions P generated by dividing the image into sixty-four regions, there are nine partial regions P extracted as the stagnant candidates. Further, the six partial regions P among those belong to the same group, and the partial regions P belonging to the group are decided as the stagnant object.

Note that, for deciding the stagnant object, the member number reference value to be compared with the number of members in each group may differ for each size of the partial region P. Specifically, in a case of the example in FIG. 7, the member number reference value to be compared with members of the group constituted by the partial regions P generated by dividing the image into sixteen regions and the member number reference value to be compared with the members of the group constituted by the partial regions P generated by dividing the image into sixty-four regions may be different from each other. In a case of the example in FIG. 7, the member number reference value applied to the partial regions P generated by dividing the image into sixteen regions may be 2 or 3, for example, and the member number reference value applied to the partial regions P generated by dividing the image into sixty-four regions may be 5 or 6, for example.

Next, with reference to a flowchart in FIG. 8, one example of a flow of processing of the image processing apparatus 10 is described.

First, the image processing apparatus 10 acquires partial region information for each frame image, the partial region information indicating a situation of a target object in each of a plurality of partial regions P within one image for each frame image (S20).

Subsequently, based on the partial region information for each frame image being acquired in S20, the image processing apparatus 10 extracts the partial region P from the plurality of partial regions P as a stagnant candidate, the partial region P to be extracted satisfying at least one (for example, both) of a condition that presence of the plurality of target objects continues at a predetermined level or higher and a condition that uniformity of a state of an aggregation constituted by the plurality of target objects being present continues at a predetermined level or higher (S21).

Subsequently, the image processing apparatus 10 generates a group in which the partial regions P adjacent to each other among the partial regions P extracted in S21 are collectively included, and detects the partial region P as the stagnant object, the partial region P belonging to a group in which the number of members is equal to or greater than the member number reference value (S22).

Note that, the image processing apparatus 10 may include an output unit that outputs information indicating the partial region P detected as the stagnant object. For example, the output unit may output an image acquired by superposing, on a frame image, the information (for example, a frame surrounding the partial region P or the like) indicating the partial region P detected as the stagnant object. The output is achieved via an output apparatus such as a display, a projection apparatus, and a printer. Note that, the information to be output may include the partial region information (presence or absence of the target object, the number of target objects, and an orientation of the target object) for each frame image that relates to the detected partial region P, in addition to the information indicating the partial region P detected as the stagnant object.

Further, information relating to the group decided as the stagnant object may further be displayed. For example, as illustrated as a "detection result" in FIG. 7, the output unit may output an image acquired by superposing, on the frame image, the information (for example, a frame surrounding a region in which the group is present, or the like) indicating the group decided as the stagnant object. Further, although not illustrated, the output unit may indicate the number of target objects belonging to each group (the total number of target objects in the partial regions P belonging to each group) on the frame image. The number of target objects belonging to each group may be displayed in association with each group on the frame image, for example (may be displayed near the frame surrounding each group or displayed in the frame, for example).

Other configurations of the image processing apparatus 10 of the present example embodiment are similar to those in the first and second example embodiments.

According to the image processing apparatus 10 of the present example embodiment, the advantageous effects similar to those in the first and second example embodiments are achieved. Further, according to the image processing apparatus 10 of the present example embodiment, the plurality of partial regions P that are adjacent to each other and form a group having a predetermined size or larger can be detected as a stagnant object, from the partial regions P extracted as a stagnant candidates. With such processing, the stagnant object having a predetermined size or larger can be detected. Further, as described in the second example embodiment, decision on whether each of the partial regions P, in other words, each of local parts of the stagnant object is a stagnant object is performed, and thus a stagnant object stagnating while changing the shape or size can be detected at high accuracy. However, when only the local parts of the stagnant object are focused without considering the entirety, detection accuracy may be degraded due to a noise component or the like. In contrast, the image processing apparatus 10 of the present example embodiment detects a candidate for the stagnant object while focusing on the local parts of the stagnant object, detects the stagnant object from the candidates for the stagnant object while focusing on a size of the entire stagnant object, and thus detection accuracy for a stagnant object is improved.

Further, the image processing apparatus 10 of the present example embodiment generates a group in which the two partial regions P satisfying "matching sizes" are collectively included. In actuality, even when two stagnant objects are present at positions away from each other, those may be captured in an image as adjacent objects with each other, depending on a photographing angle. It is possible to handle the two stagnant objects present at the positions away from each other as individual objects by generating the group in which the partial regions P satisfying a condition of "the matching sizes" are collectively included. As a result, detection accuracy for a stagnant object is improved.

Fourth Example Embodiment

An image processing apparatus 10 of the fourth example embodiment includes a function of determining abnormality occurrence location, based on a state of a target object forming a detected stagnant object. Details thereof are described below.

Figure 9:
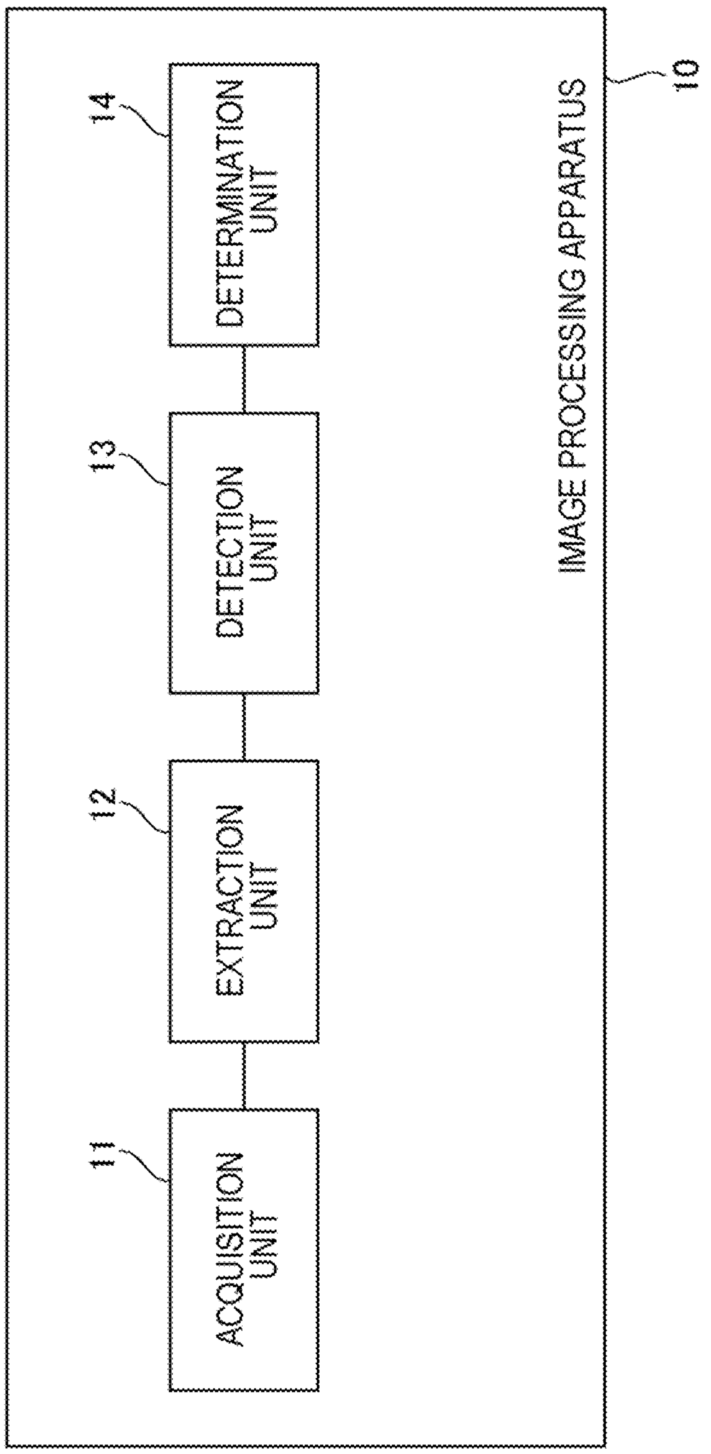
FIG. 9 is a diagram illustrating one example of a function block diagram of the image processing apparatus.

FIG. 9 illustrates one example of a function block diagram of the image processing apparatus 10. As illustrated, the image processing apparatus 10 includes an acquisition unit 11, an extraction unit 12, a detection unit 13, and a determination unit 14.

Figure 10:
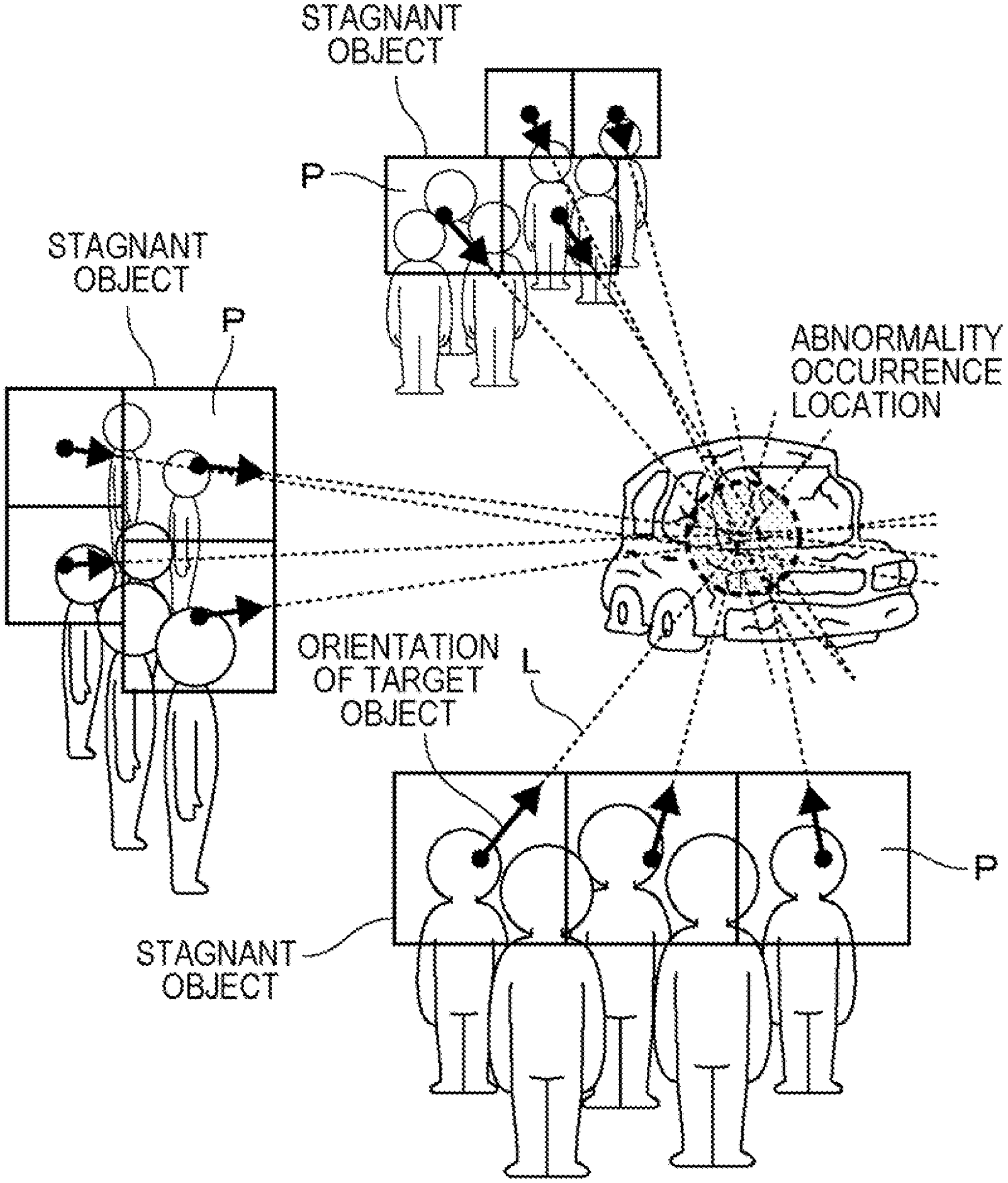
FIG. 10 is a diagram describing processing of determining an abnormality occurrence location.

The determination unit 14 determines an abnormality occurrence location, based on an orientation of a target object present in a partial region P detected as a stagnant object by the detection unit 13. Specifically, as illustrated in FIG. 10, the determination unit 14 determines, as the abnormality occurrence location, a location at which the orientation of the target object present in the partial region P detected as the stagnant object gathers. "The orientation of the target object" indicates an orientation of the target object in each of the partial regions P being indicated in partial region information for each frame image (refer to the second example embodiment).

There are various means for determining a location at which the orientation of the plurality of target objects gather, and the determination unit 14 may adopt various means. One example is described below.

Figure 11:
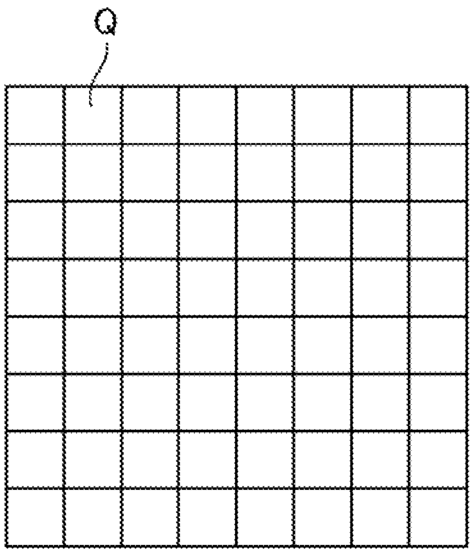
FIG. 11 is a diagram illustrating one example of an observation region.

As illustrated in FIG. 11, the determination unit 14 sets a plurality of observation regions Q within one frame image. For example, the frame image is divided into a lattice form. Further, each of the divided regions is the observation region Q. A size of the observation region Q is not particularly limited. The observation region Q and the partial region P described above may be regions having a matching position and size, or may be regions that are different from each other in at least one of a position and a size.

Further, the determination unit 14 selects the observation region Q satisfying a predetermined relationship with the orientation of the target object present in the partial region P detected as the stagnant object. Subsequently, the determination unit 14 determines, as the abnormality occurrence location, the observation region Q with a selection result satisfying a predetermined condition.

For example, as the observation region Q satisfying the predetermined relationship, the determination unit 14 selects the observation region Q through which a line passes, the line extending from a predetermined position (for example, the center) in the partial region P detected as the stagnant object, in a direction of the orientation of the target object present in the partial region P. Further, the determination unit 14 executes the processing for all the partial regions P detected as the stagnant object, and counts the number of selection times for each of the partial regions P. Further, the determination unit 14 determines, as the abnormality occurrence location, the observation region Q in which the number of selection times satisfies a predetermined condition (the highest number, the predetermined number or more, or the like).

When the orientation of the target object present in the partial region P detected as the stagnant object gathers at one point, the abnormality occurrence location can easily be determined. However, an opposite case may occur due to an error or the like of the computed orientation of the target object. As described above, even when the orientation of the target object present in the partial region P detected as the stagnant object does not gather at one point, the orientation of the target object is decided for each of the observation regions Q, and hence the abnormality occurrence location can be determined at high accuracy.

In a case of the above-mentioned method, the abnormality occurrence location can be determined in more detail within a narrower range, as the size of the observation region Q is reduced. Meanwhile, as the size of the observation region Q is reduced, it is more difficult to detect the location while approaching the processing of determining a point at which the orientation of the target object gathers.

In contrast, as the size of the observation region Q is increased, the abnormality occurrence location is determined more vaguely within a wider range. Meanwhile, as the size of the observation region Q is increased, it is easier to detect the location while separating away from the processing of determining the point at which the orientation of the target object gathers.

Figure 12:
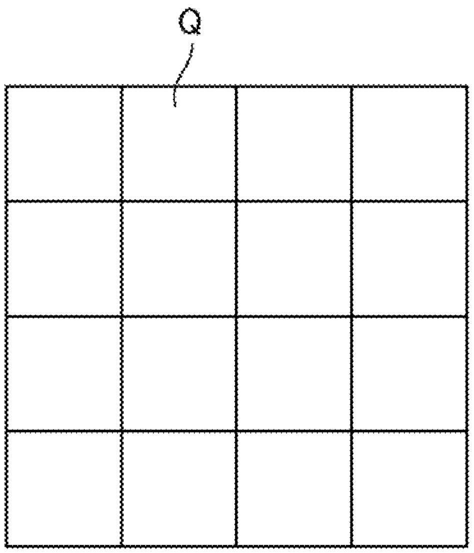
FIG. 12 is a diagram illustrating another example of the observation region.

In view of this, as illustrated in FIGS. 11 and 12, the determination unit 14 may set observation regions having different sizes from each other within one frame image, and determine the abnormality occurrence location by the above-mentioned method. In this case, for example, the determination unit 14 can determine, as the abnormality occurrence location, the observation region Q having the smallest size among the observation regions Q in which the number of selection times satisfies a predetermined condition (the highest number, the predetermined number or more, or the like).

Figure 13:
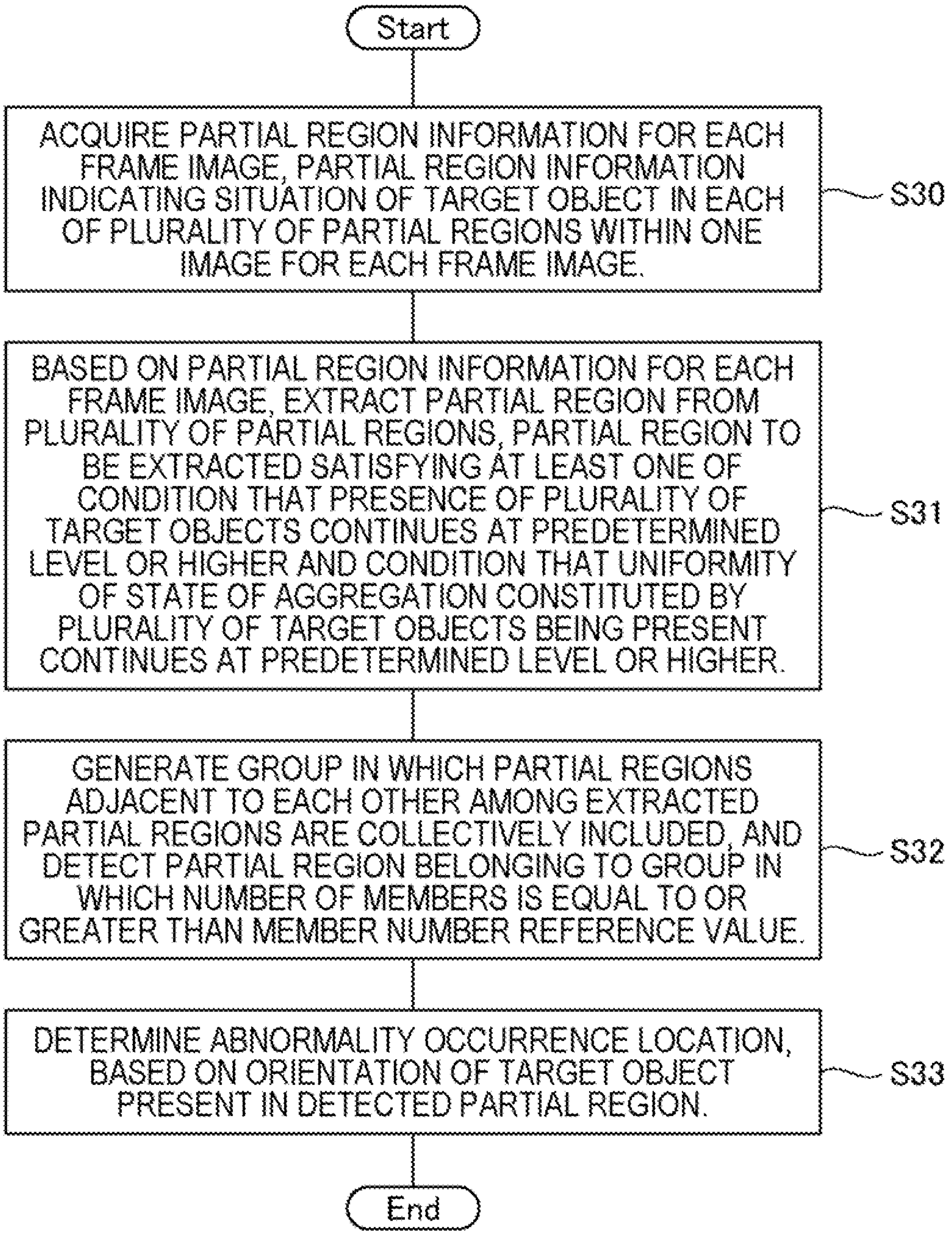
FIG. 13 is a flowchart illustrating one example of a flow of processing of the image processing apparatus.

Next, with reference to a flowchart in FIG. 13, one example of a flow of processing of the image processing apparatus 10 is described.

First, the image processing apparatus 10 acquires partial region information for each frame image, the partial region information indicating a situation of a target object in each of a plurality of partial regions P within one image for each frame image (S30).

Subsequently, based on the partial region information for each frame image being acquired in S30, the image processing apparatus 10 extracts the partial region P from the plurality of partial regions P as a stagnant candidate, the partial region P to be extracted satisfying at least one (for example, both) of a condition that presence of the plurality of target objects continues at a predetermined level or higher and a condition that uniformity of a state of an aggregation constituted by the plurality of target objects being present continues at a predetermined level or higher (S31).

Subsequently, the image processing apparatus 10 generates a group in which the partial regions P adjacent to each other among the partial regions P extracted in S31 are collectively included, and detects the partial region P as the stagnant object, the partial region P belonging to a group in which the number of members is equal to or greater than a member number reference value (S32).

Subsequently, the image processing apparatus 10 determines an abnormality occurrence location, based on an orientation of the target object present in the partial region P detected as the stagnant object in S32 (S33).

Other configurations of the image processing apparatus 10 of the present example embodiment are similar to those in the first to third example embodiments.

According to the image processing apparatus 10 of the present example embodiment, advantageous effects similar to those in the first to third example embodiments are achieved. Further, according to the image processing apparatus 10 of the present example embodiment, it is possible to determine an abnormality occurrence location, based on an orientation of a target object present in the partial region P detected as a stagnant object.

Modification Example

In the example embodiments described above, a plurality of partial regions P having different sizes from each other are set within one frame image, but only the partial regions P having one size may be set. With this, the advantageous effects similar to those in the example embodiments described above can also be exerted to a certain extent. Further, a processing load of a computer can be reduced by reducing the number of set partial regions P.

While the example embodiments of the present invention have been described with reference to the drawings, the example embodiments are only exemplification of the present invention, and various configurations other than the above-described example embodiments can also be employed. The configurations of the example embodiments described above may be combined with each other, or some of the configurations may be replaced with other of the configurations. Further, various changes may be made to the configurations of the example embodiments described above without departing from the gist. Further, the configurations or the processing that are disclosed in the example embodiments and the modification examples described above may be combined with each other.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is inconsistent.

A part or the whole of the above-described example embodiment may also be described in supplementary notes below, which is not limited thereto.

1. An image processing apparatus including:
   an acquisition unit that acquires partial region information for each frame image, the partial region information indicating a situation of a target object in each of a plurality of partial regions within one image for each frame image; and
   an extraction unit that extracts the partial region from a plurality of the partial regions, based on the partial region information for the each frame image, the partial region to be extracted satisfying at least one of a condition that presence of a plurality of the target objects continues at a predetermined level or higher and a condition that uniformity of a state of an aggregation constituted by a plurality of the target objects being present continues at a predetermined level or higher.
2. The image processing apparatus according to supplementary note 1, further including
   a detection unit that generates a group by grouping the extracted partial regions adjacent to each other, and detects the partial region belonging to the group in which a number of partial regions belonging thereto is equal to or greater than a member number reference value.
3. The image processing apparatus according to supplementary note 2, wherein
   the acquisition unit acquires partial region information for the each frame image, the partial region information indicating a situation of the target object in each of a plurality of the partial regions having different sizes from each other for each frame image, and
   the detection unit generates a group by grouping the extracted partial regions adjacent to each other and having a uniform size, and detects the partial region belonging to the group in which a number of partial regions belonging thereto is equal to or greater than the member number reference value.
4. The image processing apparatus according to any one of supplementary notes 1 to 3, wherein
   the extraction unit decides that, in the partial region, presence of a plurality of the target objects continues at a predetermined level or higher, the partial region being a region in which a ratio of a frame image including M or more target objects (M is an integer of two or more) with respect to a predetermined number of consecutive frame images is equal to or greater than a ratio reference value.
5. The image processing apparatus according to supplementary note 4, wherein
   the extraction unit decides that, in the partial region, presence of a plurality of the target objects continues at a predetermined level or higher, the partial region being a region in which a number of consecutive frame images including M or more target objects (M is an integer of two or more) is equal to or greater than a consecutive number reference value.
6. The image processing apparatus according to any one of supplementary notes 1 to 3, wherein
   the extraction unit decides that, in the partial region, presence of a plurality of the target objects continues at a predetermined level or higher, the partial region being a region in which the target object is detected in a predetermined number of consecutive frame images and a ratio of a frame image including M or more target objects (M is an integer of two or more) is equal to or greater than a ratio reference value.
7. The image processing apparatus according to supplementary note 6, wherein
   the extraction unit decides that, in the partial region, presence of a plurality of the target objects continues at a predetermined level or higher, the partial region being a region in which the target object is detected and a number of consecutive frame images including M or more target objects (M is an integer of two or more) is equal to or greater than a consecutive number reference value.
8. The image processing apparatus according to any one of supplementary notes 1 to 3, wherein the extraction unit decides the uniformity, based on at least one of density of a plurality of the target objects and an orientation of a plurality of the target objects.

9. The image processing apparatus according to supplementary note 8, wherein
the extraction unit
computes at least one of dispersion of density of a plurality of the target objects and dispersion of an orientation of a plurality of the target objects for each of the partial regions, based on a part or all of a predetermined number of consecutive frame images, and
decides that, in the partial region, uniformity of a state of an aggregation constituted by a plurality of the target objects being present continues at a predetermined level or higher, the partial region being a region in which the dispersion being computed is equal to or less than a dispersion reference value.

10. The image processing apparatus according to supplementary note 2 or 3, further including
a determination unit that determines an abnormality occurrence location, based on an orientation of the target object present in the partial region being detected.

11. The image processing apparatus according to supplementary note 10, wherein
the determination unit
sets a plurality of observation regions in one image,
selects the observation region satisfying a predetermined relationship with an orientation of the target object being present in the partial region being detected, and
determines, as the abnormality occurrence location, the observation region with a selection result satisfying a predetermined condition.

12. The image processing apparatus according to supplementary note 11, wherein
the determination unit sets the observation regions having different sizes from each other in one image.

13. The image processing apparatus according to any one of supplementary notes 1 to 3, wherein
the extraction unit extracts the partial region from a plurality of the partial regions, based on partial region information for the each frame image, the partial region to be extracted satisfying both a condition that presence of a plurality of the target objects continues at a predetermined level or higher and a condition that uniformity of a state of an aggregation constituted by a plurality of the target objects being present continues at a predetermined level or higher.

14. The image processing apparatus according to supplementary note 2 or 3, further including
an output unit that indicates a region on the frame image including the group to which the partial region being detected belongs, and outputs information indicating a number of the target objects belonging to the group.

15. An image processing method including,
by a computer:
acquiring partial region information for each frame image, the partial region information indicating a situation of a target object in each of a plurality of partial regions within one image for each frame image; and
extracting the partial region from a plurality of the partial regions, based on the partial region information for the each frame image, the partial region to be extracted satisfying at least one of a condition that presence of a plurality of the target objects continues at a predetermined level or higher and a condition that uniformity of a state of an aggregation constituted by a plurality of the target objects being present continues at a predetermined level or higher.

16. A program causing a computer to function as:
an acquisition unit that acquires partial region information for each frame image, the partial region information indicating a situation of a target object in each of a plurality of partial regions within one image for each frame image; and
an extraction unit that extracts the partial region from a plurality of the partial regions, based on the partial region information for the each frame image, the partial region to be extracted satisfying at least one of a condition that presence of a plurality of the target objects continues at a predetermined level or higher and a condition that uniformity of a state of an aggregation constituted by a plurality of the target objects being present continues at a predetermined level or higher.

10 Image processing apparatus
11 Acquisition unit
12 Extraction unit
13 Detection unit
14 Determination unit
1A Processor
2A Memory
3A Input/output I/F
4A Peripheral circuit
5A Bus

The invention claimed is:

1. An image processing apparatus comprising:
at least one memory configured to store one or more instructions; and
at least one processor configured to execute the one or more instructions to:
acquire partial region information for each frame image, the partial region information indicating a situation of a target object in each of a plurality of partial regions within one image for each frame image;
extract a partial region from a plurality of the partial regions, based on the partial region information for the each frame image, the partial region to be extracted satisfying at least one of a condition that presence of a plurality of target objects continues at a predetermined level or higher and a condition that uniformity of a state of an aggregation constituted by a plurality of the target objects being present continues at a predetermined level or higher;
generate a group by grouping the extracted partial regions adjacent to each other, and detect the partial region belonging to the group in which a number of partial regions belonging thereto is equal to or greater than a member number reference value;
determine an abnormality occurrence location, based on an orientation of the target object present in the partial region being detected;
set a plurality of observation regions in one image;
select the observation region satisfying a predetermined relationship with an orientation of the target object being present in the partial region being detected; and determine, as the abnormality occurrence location, the observation region with a selection result satisfying a predetermined condition.

2. The image processing apparatus according to claim 1, wherein the processor is further configured to execute the one or more instructions to:

acquire partial region information for the each frame image, the partial region information indicating a situation of the target object in each of a plurality of the partial regions having different sizes from each other for each frame image, and generate a group by grouping the extracted partial regions adjacent to each other and having a uniform size, and detect the partial region belonging to the group in which a number of partial regions belonging thereto is equal to or greater than the member number reference value.

3. The image processing apparatus according to claim 1, wherein the processor is further configured to execute the one or more instructions to decide that, in the partial region, presence of a plurality of the target objects continues at a predetermined level or higher, the partial region being a region in which a ratio of a frame image including M or more target objects (M is an integer of two or more) with respect to a predetermined number of consecutive frame images is equal to or greater than a ratio reference value.

4. The image processing apparatus according to claim 3, wherein the processor is further configured to execute the one or more instructions to decide that, in the partial region, presence of a plurality of the target objects continues at a predetermined level or higher, the partial region being a region in which a number of consecutive frame images including M or more target objects (M is an integer of two or more) is equal to or greater than a consecutive number reference value.

5. The image processing apparatus according to claim 1, wherein the processor is further configured to execute the one or more instructions to decide that, in the partial region, presence of a plurality of the target objects continues at a predetermined level or higher, the partial region being a region in which the target object is detected in a predetermined number of consecutive frame images and a ratio of a frame image including M or more target objects (M is an integer of two or more) is equal to or greater than a ratio reference value.

6. The image processing apparatus according to claim 5, wherein the processor is further configured to execute the one or more instructions to decide that, in the partial region, presence of a plurality of the target objects continues at a predetermined level or higher, the partial region being a region in which the target object is detected and a number of consecutive frame images including M or more target objects (M is an integer of two or more) is equal to or greater than a consecutive number reference value.

7. The image processing apparatus according to claim 1, wherein the processor is further configured to execute the one or more instructions to decide the uniformity, based on at least one of density of a plurality of the target objects and an orientation of a plurality of the target objects.

8. The image processing apparatus according to claim 7, wherein the processor is further configured to execute the one or more instructions to:

compute at least one of dispersion of density of a plurality of the target objects and dispersion of an orientation of a plurality of the target objects for each of the partial regions, based on a part or all of a predetermined number of consecutive frame images, and decide that, in the partial region, uniformity of a state of an aggregation constituted by a plurality of the target objects being present continues at a predetermined level or higher, the partial region being a region in which the dispersion being computed is equal to or less than a dispersion reference value.

9. The image processing apparatus according to claim 1, wherein the processor is further configured to execute the one or more instructions to set the observation regions having different sizes from each other in one image.

10. The image processing apparatus according to claim 1, wherein the processor is further configured to execute the one or more instructions to extract the partial region from a plurality of the partial regions, based on partial region information for the each frame image, the partial region to be extracted satisfying both a condition that presence of a plurality of the target objects continues at a predetermined level or higher and a condition that uniformity of a state of an aggregation constituted by a plurality of the target objects being present continues at a predetermined level or higher.

11. The image processing apparatus according to claim 1, wherein the processor is further configured to execute the one or more instructions to indicate a region on the frame image including the group to which the partial region being detected belongs, and output information indicating a number of the target objects belonging to the group.

12. An image processing method comprising, by a computer:

acquiring partial region information for each frame image, the partial region information indicating a situation of a target object in each of a plurality of partial regions within one image for each frame image;

extracting a partial region from a plurality of the partial regions, based on the partial region information for the each frame image, the partial region to be extracted satisfying at least one of a condition that presence of a plurality of target objects continues at a predetermined level or higher and a condition that uniformity of a state of an aggregation constituted by a plurality of the target objects being present continues at a predetermined level or higher;

generating a group by grouping the extracted partial regions adjacent to each other, and detecting the partial region belonging to the group in which a number of partial regions belonging thereto is equal to or greater than a member number reference value;

determining an abnormality occurrence location, based on an orientation of the target object present in the partial region being detected;

setting a plurality of observation regions in one image;

selecting the observation region satisfying a predetermined relationship with an orientation of the target object being present in the partial region being detected; and determining, as the abnormality occurrence location, the observation region with a selection result satisfying a predetermined condition.

13. A non-transitory storage medium storing a program causing a computer to:

acquire partial region information for each frame image, the partial region information indicating a situation of a target object in each of a plurality of partial regions within one image for each frame image;

extract a partial region from a plurality of the partial regions, based on the partial region information for the each frame image, the partial region to be extracted satisfying at least one of a condition that presence of a plurality of target objects continues at a predetermined level or higher and a condition that uniformity of a state of an aggregation constituted by a plurality of the target objects being present continues at a predetermined level or higher;

generate a group by grouping the extracted partial regions adjacent to each other, and detect the partial region belonging to the group in which a number of partial regions belonging thereto is equal to or greater than a member number reference value;

determine an abnormality occurrence location, based on an orientation of the target object present in the partial region being detected;

set a plurality of observation regions in one image;

select the observation region satisfying a predetermined relationship with an orientation of the target object being present in the partial region being detected; and determine, as the abnormality occurrence location, the observation region with a selection result satisfying a predetermined condition.

* * * * *